United States Patent Office 3,398,015
Patented Aug. 20, 1968

3,398,015
AMYLOSE FILM
Sheldon A. Buckler, Stamford, Conn., and Felix J. Germino, Yorktown Heights, N.Y., assignors to American Machine & Foundry Company, a corporation of New Jersey
No Drawing. Filed Apr. 1, 1964, Ser. No. 356,637
7 Claims. (Cl. 117—118)

ABSTRACT OF THE DISCLOSURE

Broadly, this invention provides a self-sustaining amylose film wherein at least some of the hydroxyl radicals on the surface are replaced by hydrophobic radicals and there is a relative absence of like hydrophobic radicals beneath the film surface. The invention also covers the method for modifying the surface of amylose films by treating an amylose film with a compound containing a hydroxyl reactive hydrophobic radical which reacts with the hydroxyl radicals of the amylose film.

---

This invention relates to self-supported amylose films having a high degree of transparency, flexibility, tensile strength and water insolubility. More particularly, this invention relates to a method for producing films with these characteristics consisting substantially or predominately of the linear or A fraction of starch and comprise predominately linear 1,4-linked anhydro-glucose polymer by chemically modifying the film subsequent to its formation.

Heretofore amylose films once formed have been considered substantially unreactive to alteration by chemical treatment. Accordingly, while the chemical modification of amylose, as for example, to enhance the wider resistance of the film needs therefrom, has been disclosed in the prior art, such chemical changes have generally been effected on the amylose prior to the formation of the film. One serious drawback to chemical treatment of amylose dispersions as distinguished from the treatment of preformed film is that less than a substantially complete change of all amylose molecules in the dispersion is not practical. As a consequence in modifying amylose as a dispersion certain desirable characteristics possessed by amylose cannot be retained due to the integrated change which takes place. In treating the surface of the preformed film, however, only the surface of the film is altered. In this way the surface characteristics of modified amylose are obtained while at the same time substantially retaining the desired characteristics of amylose in molecular layers of the film between the surfaces. Another important consideration when amylose dispersion is treated is the interference likely to occur between the chemical agent used to modify the amylose molecule and the dispersion medium in which amylose is dissolved and from which the film is to be formed. Moreover, difficulties encountered in dissolving amylose become even more acute when chemical modifiers are added to the same system whose primary aim is a suitable film forming solution. A further consideration resides in the fact that too little, as well as an excessive amount of, replacement of the hydroxyl groups of the amylose molecule is undesirable. Control in modifying the amylose in dispersion compared to treatment on the preformed film is relatively more difficult.

It is an object of the present invention to provide a novel amylose film having increased tensile strength, flexibility and water insensitivity.

It is another and more specific object of the invention to provide amylose film which has a post-formed chemically modified surface.

It is a further object of the invention to provide a method for the production of amylose film characterized by having hydrophobic groups predominately on the film surface.

Additional objects and advantages will become apparent from the description of the product and method for obtaining it herein provided.

Essentially the invention concerns the preparation of amylose film by any of various methods known in the art such as by casting, extrusion and the like, thereafter drying the film to more or less the desired level, i.e., so that the film as a practical matter is at least substantially non-tacky and can be practically handled where the film is prepared from an aqueous bath, the film is dried so that it contains not more than about 15% moisture. Thereafter the film is treated by immersion in a chemically modifying bath. Alternately the film may be subjected to an atmosphere saturated with vapor of the chemical compound, and thereafter dried.

Various methods for making amylose films have been described heretofore and may be effectively utilized in preparing the film to be treated in accordance to the invention. For example, methods which use complexing agents as an aid for solubilization of amylose such as the method disclosed in U.S. Patent 2,608,723, as described therein, the amylose is separated from the complexing agent by azeotropic distillation and the residual amylose solution is dried.

Another method is that of U.S. Patents 2,902,336 and 3,030,667 which teach the preparation of amylose films by dissolving the amylose in aqueous sodium hydroxide solution and extruding the solution into salt solutions of various types and concentrations.

The method of U.S. Patent 2,822,581 may also be used. This patent discloses the formation of transparent amylose films having improved wet strength prepared by dissolving amylose without complexing agents, casting and drying the film at a temperature higher than the gelation temperature of the solution followed by drying.

Amylose films according to our invention are those containing at least 60% amylose and preferable those in which the amylose content is 85% or more. The amylose may be derived from any conventional source relied upon by the art, e.g., corn, potato, tapioca, hybrid corn, or other grain or tuber starches.

The process of this invention may be carried out batchwise but the preferred method is to continuously chemically modify film which has been produced by a continuous process, i.e., either by extruding or casting, as generally employed in the film forming art.

The invention essentially comprises treating amylose film which has been derived in any known manner with a hydroxyl reactive compound, that is, a compound which reacts with the available —OH groups of amylose molecules, to produce a surface which is relatively hydrophobic as compared to the unreacted film.

Compounds capable of furnishing suitable chemical modification of the amylose film surface, i.e., of providing hydrophobic radicals in substitution for the amylose hydroxyl groups includes, fatty acid anhydrides, for example, acetic, propionic, butyric, maleic, succinic, phthalic and the like; ketene; acyl halides, for example, acetyl chloride or bromide, succinyl chloride, propronyl chloride, capryl chloride, and the like; alkyl and benzyl halides, for example, methyl, ethyl and propyl chlorides, bromides and benzyl chlorides and bromides and the like; ethers, for example, ethylene oxide, propylene oxide, and the like; lactones, for example, beta-propiolactone, butyrolactone, and the like; isocyanates, for example, methylene-bis-4-phenyl isocyanate, phenyl isocyanate, methyl isocyanates, and the like; metallic or metalloid halides, for example, dimethyldichloro silane, phenyldichlorophosphine oxide, dibutylchloroborane, etc.

In general, the invention contemplates the provision of a suitable liquid dispersion containing one or more of such reactive compounds over a wide range of concentrations, due consideration being given to the residence time, practicality of preparing specific concentration of given compounds, etc. Generally, treating solutions in which the compounds are present in about of from 1% to 25% by weight preferably in concentrations of about 5% to 20% by weight are satisfactory in most cases. It will be apparent, however, that concentrations as high as 100% may be employed. For example, a bath consisting of substantially pure reactive compound may be employed without added solvent if the reactive compound is a liquid under the conditions employed. Suitable catalysts may be employed if desired.

In addition to liquid treating baths containing the compound effective to chemically modify the surface of the preformed amylose film, such film may also, in lieu of a liquid bath, be modified by exposure for a suitable residence time to an atmosphere composed of suitable concentrations of the reactive composed. In this connection, for example, a substantially vapor tight chamber in which the atmosphere comprises ethylene or propylene oxide may be utilized.

Only a relatively minor proportion of hydroxyl group substitution is necessary to produce substantial advantage to the amylose film. In general, even with thinner film of one mil or less, the treatment in accordance to the invention, is a substitution on not more than about 2% of the total hydroxyl groups of the amylose. Usually the quantity of substitution is considerably less than 2%.

The description of the invention is supplemented by the following examples which are illustrative of the invention. All parts are parts by weight except where expressly stated otherwise.

Example I 660 parts of amylose are dispersed in 4340 parts of water containing 42 parts of glycerine and solution is effected by passing this slurry through a continuous autoclave at a temperature of 150° C., and a flow rate of 60 parts/min. The solution is cast on a glass plate and dried. One half of the dry film is placed in a low humidity chamber (20% RH at 25° C.) for 24 hours. The film upon touch of the hand is brittle and shatters when flexed.

The other half of the slurry is treated by passing it through a bath containing acetic anhydride, benzene and perchloric acid in ratio of (76:60:.048). The film after passing through the bath is dried at temperature of 100° C. The film had 20% increase in dry tensile strength and 75% increase in wet tensile properties over the control sample. It likewise has a 30% increase in elongation over the control sample.

Example II

Extended amylose film is festooned through 10% solution of phenylisocyanate in benzene containing a small amount of triethylenediamine. The film is then passed through a heating zone to fix the hydrophobic reactant and to remove the solvent. The film obtained by this treatment has improved flexibility and resistance to moisture.

Example III

Amylose film prepared by the method of U.S. Patent 2,608,723, i.e., through the use of a complexing agent, is passed through a heated gas chamber saturated with ethylene oxide. Unreacted ethylene oxide is then removed by passing a vigorous air stream around the film. The resulting amylose film has greater flexibility and increased tensile strength over the untreated film.

Example IV

Cast amylose film is immersed in a bath containing 25% caprylchloride in benzene, and then passed through a heated chamber to remove the benzene solvent. The resulting film has marked moisture resistance and increased tensile strength and flexibility over the untreated control.

Example V

The procedure of Example IV is repeated employing benzylchloride in place of caprylchloride. The moisture resistance and tensile strength of the film are significantly improved over the untreated control.

Example VI

Amylose film prepared by the regeneration method of U.S. Patent 2,902,336 is immersed in a warm solution of 25% dimethyldichlorosilane in benzene, removed, and allowed to dry in air. The resulting film has a marked increase in resistance to moisture compared to the untreated control.

Example VII

The procedure of Example VI is repeated employing beta-propiolactone in place of dimethyldichlorosilane. The moisture resistance of the resulting film is improved significantly over the untreated control.

Example VIII

The procedure of Example III is repeated employing ketene in place of ethylene oxide. The tensile properties and resistance to moisture in the treated film are markedly superior to those properties in the control sample.

Example IX

Parallel runs were conducted wherein amylose film was dipped in: (a) acetic anhydride; (b) propionic anhydride; (c) butyric anhydride; (d) a 50/50 mixture of acetic and butyric anhydride; (f) a 35:30:35 mixture of acetic; propionic; butyric anhydride and compared with a control sample. The order of increased dry strength and wet strength respectively of each was as follows: (a) 18% and 66%; (b) 23.5% and 68%; (c) 26% and 71%; (d) 39% and 53%; (e) 31% and 61%; and (f) 20% and 70%.

Example X

The procedure of Example II is repeated using instead of ethylene oxide, propylene oxide. The product has a 15% increase in dry tensile strength and a 42% increase in wet tensile strength.

Example XI

Amylose film prepared according to the example set and in U.S. Patent 2,822,581 is prepared. One portion of the film is treated by dispersing it in a solution of acetylchloride in water and dried and compared with an untreated control sample. The acetylchloride treated sample has a 10% increase dry tensile strength and a 20% increase in elongation over the control.

Example XII

The procedure of Example III is repeated with the exception that dimethyldichlorosilane vapor is used instead of ethylene oxide. Wet tensile properties were increased by more than 35%.

Example XIII

The procedure of Example XI is repeated using instead, as the film treating bath a 20% solution of methylene-bis-4-phenylisocyanate in triethylamine. Tensile strength is increased more than 20% and elongation more than 18% over the control.

Various modifications apparent to those skilled in the art may be made in the invention herein presented without departing from the concept contributed to the art. Accordingly, such modifications are to be considered within the contemplation of the invention except where precluded by limitations in the appended claims.

What is claimed is:

1. A method for chemically modifying the surface of amylose film comprising contacting preformed amylose film for a period of time sufficient to substitute on the surface of the film up to 2% of the total hydroxyl groups of the amylose with a compound containing a hydroxyl reactive hydrophobic radical selected from the group consisting of fatty acid anhydrides, ketene, acetyl halides, lower alkyl halides, benzyl halides, lower alkylene oxides, lactones of lower carboxylic acids, phenyl isocyanates, lower alkyl isocyanates, organo silicon halides, phenyldichlorophosphine oxide, and dibutylchloroborane.

2. The method of claim 1 wherein the reaction is effected by treating the amylose film in a liquid bath.

3. The method of claim 1 wherein the reaction is effected by treating the amylose film in a gaseous atmosphere containing the hydrophobic reactant.

4. The method of claim 1 wherein said compound containing a hydroxyl reactive hydrophobic radical is a fatty acid anhydride.

5. The method of claim 1 wherein said compound containing a hydroxyl reactive hydrophobic radical is an acetyl halide.

6. The method of claim 1 wherein said compound containing a hydroxyl reactive hydrophobic radical is a lower alkylene oxide.

7. A self-sustaining amylose film characterized by having at least some of the hydroxyl radicals on the surface of the film replaced by substitution with hydrophobic radicals on the surface of the film and relative absence of said hydrophobic radicals beneath the film surface made by the process of claim 1.

References Cited

UNITED STATES PATENTS

| | | | |
|---|---|---|---|
| 2,125,901 | 8/1938 | Evans et al. | 117—143 |
| 2,307,045 | 1/1943 | Iler et al. | 116—118 X |
| 2,516,633 | 7/1950 | Kesler et al. | 260—233.3 |
| 2,656,571 | 10/1953 | Davis et al. | 264—217 |
| 2,983,626 | 5/1961 | Schneider et al. | 117—118 X |
| 3,038,895 | 6/1962 | Rutenberg et al. | 260—233.35 X |
| 3,112,984 | 12/1963 | Alridge | 8—115.5 |

FOREIGN PATENTS 847,431  4/1960  Great Britain.

OTHER REFERENCES

Schuyten et al., Textile Research Journal, July 1948, pp. 386, 387 TS 1300.

RALPH S. KENDALL, *Primary Examiner.*